United States Patent [19]

Bommarito

[11] Patent Number: 5,480,393
[45] Date of Patent: Jan. 2, 1996

[54] NEEDLE FREE ACCESS ADAPTER

[76] Inventor: Alexander A. Bommarito, 12555 W. Freeland Rd., Freeland, Mich. 48623

[21] Appl. No.: 372,775
[22] Filed: Jan. 13, 1995

Related U.S. Application Data

[63] Continuation-in-part of Ser. No. 228,714, Apr. 18, 1994, abandoned, which is a continuation-in-part of Ser. No. 85,160, Jul. 2, 1993, Pat. No. 5,321,906.
[51] Int. Cl.⁶ ................................................. A61M 25/00
[52] U.S. Cl. ........................... 604/283; 604/326; 604/905
[58] Field of Search ..................................... 604/283, 256, 604/240, 241, 243, 284, 264, 326, 905

[56] References Cited

U.S. PATENT DOCUMENTS 4,963,132 10/1990 Gibson.
4,991,629 2/1991 Ernesto et al..

Primary Examiner—C. Fred Rosenbaum
Assistant Examiner—Perry E. Van Over
Attorney, Agent, or Firm—Merlin B. Davey

[57] ABSTRACT

This invention provides medical devices commonly accessed by syringes, said devices being characterized by comprising a cleanable, leakless built-in friction-fitting inlet-outlet port, said port being in the shape of the frustum of a cone, said frustum having a base and a top, said base being broader than said top, said frustum comprising a generally annular centrally disposed passageway extending therethrough and connecting with and in operative communication with a generally tubular neck at said base.

5 Claims, 1 Drawing Sheet

NEEDLE FREE ACCESS ADAPTER

CROSS-REFERENCE TO RELATED APPLICATIONS

This application is a continuation-in-part of application Ser. No. 228,714 filed Apr. 18, 1994, now abandoned, which is a continuation-in-part of application Ser. No. 08/085,160 filed Jul. 2, 1993 which is now U.S. Pat. No. 5,321,906 issued Jun. 21, 1994.

BACKGROUND OF THE INVENTION

Needleless systems are a major desire in health care facilities to reduce the risk of needle stick injury. Annual incidence has been estimated at 600,000 to 1 million needle sticks in the United States, which represents the second most frequent cause of hospital employee injury. The majority of these injuries are defined as contaminated and about 70 percent occur after the needle has been used. The risk of injury is primarily borne by nursing personnel which account for 65–70 percent of the reported injuries. The cost of managing each injury ranges from $1400 to $2000 per incident in U.S. hospitals.

The new OSHA regulations were developed as a result of the petitions of unions representing health care employees, to protect their employees from occupational exposure to blood borne diseases. This concern and the resulting publicity of care providers who have been injured with a contaminated needle has driven the development of the new products which can assist the care provider in minimizing their risk of personal injury.

Safety syringes, protected needles and needle free Intra-Venous (IV) systems have been on the market since 1991. There are few issues that have generated as much attention and emotion among the hospital staff and patients as the need to address the safe use of needles in patient care delivery systems.

It is a desideratum of the art to provide a product that will meet hospital requirements for a universal fit with any I.V. fluid, set, pump, catheter or syringe system in hospital use.

SUMMARY OF THE INVENTION

The present invention provides a needle free access adapter system comprising a male unit and a female unit, said units being built into and/or adapted to operatively engage the outlet end of syringes and medical devices in common use forming compatible leakless connections for use in I.V. access, Heparin lock access, blood administration and collection, anesthesia medication delivery, catheters and I.V. tubing connectors.

In another aspect, this invention provides medical devices commonly accessed by syringes, said devices being characterized by comprising a cleanable, leakless built-in friction-fitting inlet-outlet port, said port being in the shape of the frustum of a cone, said frustum having a base and a top, said base being broader than said top, said frustum comprising a generally annular centrally disposed passageway extending therethrough and connecting with and in operative communication with a generally tubular neck at said base.

DETAILED DESCRIPTION OF THE INVENTION

More particularly, the present invention relates to a needle free access adapter system comprising a male unit and a female unit, each of said units having a first end and a second end, said male unit having a centrally disposed tube having a first end, a mid portion and a second end, said mid portion of said tube being disposed within an internally, circumferentially threaded cup having a base and an open end, said first end of said tube being in the form of a friction-fitting port with shape of the frustum of a cone for leakless medical device connections extending from said base of said cup, said second end of said tube and said open end of said cup being cooperatively adapted to mate with and engage the threaded lock system of a female Luer fitting of any medical device, said female unit comprising a hollow cylindrical portion in operative communication with said first end and said second end and having internal shoulders positioned toward said first end, said first end being in the form of a friction-fitting port in the shape of the frustum of a cone for leakless medical device connections and said second end comprising a flange adapted to engage with the threaded lock system of a standard syringe or other male Luer fittings on medical devices for use in, for example, Heparin lock access, blood collection, anesthesia medication delivery, catheters, attachment to spikes for use in withdrawing or adding fluids to and from vials, and I.V. tubing connections. The system of this invention takes advantage of the currently available threaded Luer Lock system of male and female fittings found, for example, on standard syringes or cathethers on the market today. By providing both a male and a female unit or adapter capable of engaging the threaded lock system found on, for example, standard syringes or cathethers on the market today, or capable of a simple friction fit to a standard syringe or to the tubes used for various medical infusions, or by building a friction-fit port into said syringes or medical devices, it is now possible to avoid the use of needles in many hospital situations, thereby reducing the need for needles and increasing hospital safety.

The adapters of this invention may be made of the usual medically inert plastics such as, for example, nylon, polycarbonate or polypropylene.

BRIEF DESCRIPTION OF THE DRAWINGS

The invention is further illustrated by the accompanying drawings wherein:

Referring to FIG. 1, 17 is an illustration of the threaded lock system (Luer-lock top) found, for example, on standard syringes in use today. As seen in FIG. 1, the threaded lock system comprises an internally, circumferentially threaded hollow cylinder 12 enclosing a hollow centrally disposed tube 14 being in operative connection with a friction fitting port 32, via neck 28, and flange 22, and having internal shoulders 26, said flange 22 being adapted to operatively engage threaded cylinder 12. Friction fitting port 32 and neck 28 define passageway 30. Tube 14 is adapted to extend into adapter 18 when said adapter 18 is threaded into cylinder 12 such that end 20 of tube 14 presses onto shoulder 26 and passageway 30 is in operative communication with tube 14.

For general use, the friction fitting port 32 of the adapters of this invention is advantageously designed to be from about 0.065 inch at the outlet to about 0.090 inch in diameter at the base, the base having shoulders 37 for providing a sealing contact with the interior surface of the discharge end of a standard syringe, and having a length of about 0.200 inch.

Cap 34 is used to tightly cover friction fitting port 32 and keep it aseptic while making it readily available for cleaning or use.

Figure 1:
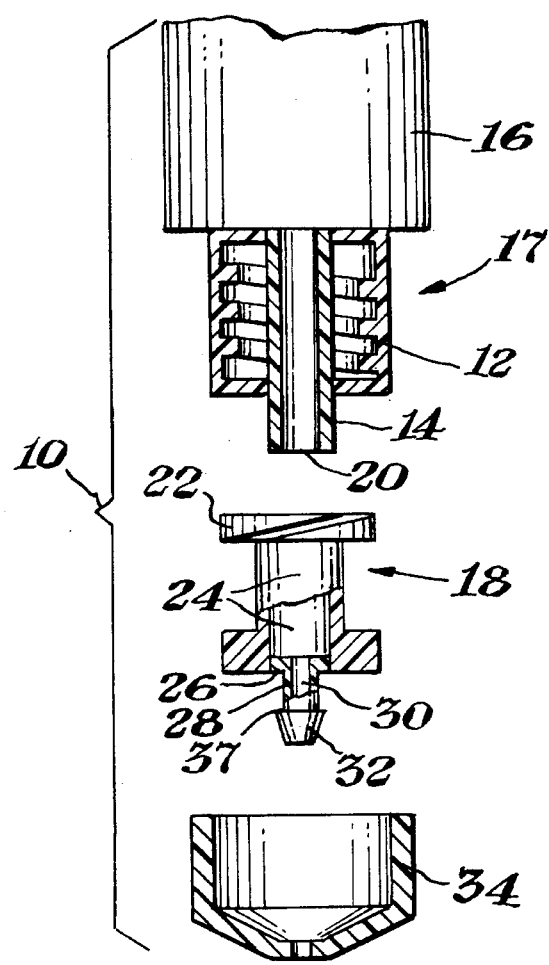
FIG. 1 is an exploded sectional view illustrating one use of a female needle free access adapter in accordance with one embodiment of the present invention.
Figure 2:
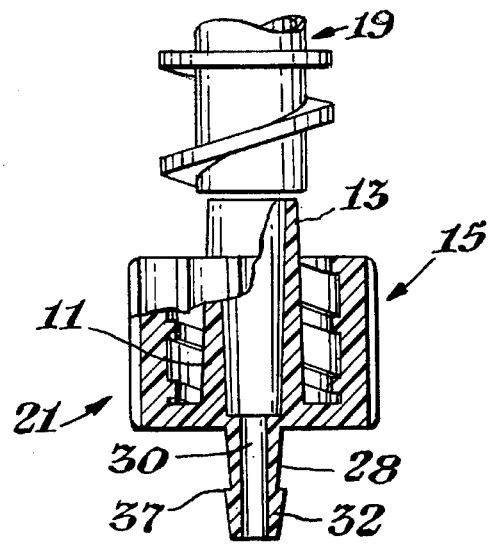
FIG. 2 is a partially sectional view of a male adapter of the present invention.

FIG. 2 illustrates one embodiment of a male adapter 21 in accordance with the present invention, said adapter comprising an internally, circumferentially threaded hollow cylinder or cup 15 enclosing a hollow centrally disposed tube 11 extending out both ends of cup or cylinder 15, a first end 13 of said tube being adapted to mate with and operatively engage with the threaded portion of, for example, a spike such as is used to withdraw fluid from a vial, the mating end 19 only of a spike being illustrated.

Figure 3:
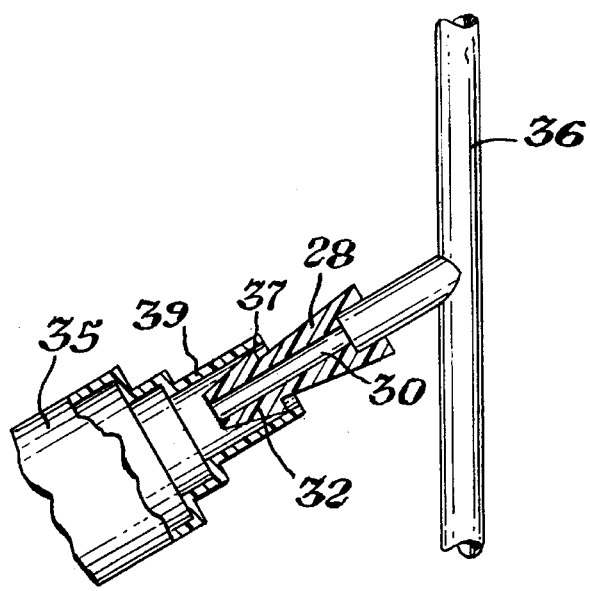
FIG. 3 is a partially cut-away sectional view of a friction fitting port of the present invention built into an I.V. set.

FIG. 3 is a partially cut-away sectional view of a friction-fiting port 32 built into an I.V. set 36 and illustrates only one of the possibilities wherein the leakless connections of the present invention may be built directly into medical devices and attached to a syringe 35 in accordance with the present invention.

As can be seen in FIG. 3, shoulders 37 of port 32 securely engage the interior passageway of discharge end 39 of syringe 35 with minimum surface area contact, permitting easy insertion and withdrawal while providing a secure connection that permits rotation of the syringe for easy reading without leaking or locking.

The unique combination of the Luer fittings threaded lock system with the leakless friction-fitting port of this invention provides a needle free, aseptic, cleanable, reusable and sterilizable system for health care givers, the system being not only safe but efficient and effective. New systems on the market are not cleanable with standard antiseptic procedures. No further adapters are necessary to access I.V. connectors and needle sticks are reduced or eliminated. The leakless friction-fitting port can be built into, for example, I.V. sets, Heaprin lock access, blood administration and collection, anesthesia medication delivery, cathethers and other medical devices. The connected adapters of this invention have been found to withstand pressures as high as 100 psi without leakage and without locking. This is three (3) times higher than pressures used in usual clinical settings.

Various modifications may be made in the present invention without departing from the spirit or scope thereof as will be apparent to those skilled in the art.

I claim:

1. A needle free removable, cleanable, rotatable and reusable access adapter system comprising at least one member of the group consisting of a male unit and a female unit, each of said units having a first end and a second end, said male unit having a centrally disposed tube having a first end, a mid portion and a second end, said mid portion of said tube being disposed within an internally, circumferentially threaded cup having a base and an open end, said first end of said tube being in the form of a friction-fitting port in the shape of the frustum of a cone for leakless medical device connections extending from said base of said cup, said second end of said tube and said open end of said cup being cooperatively adapted to mate with and engage the threaded lock system of a female Luer fitting of any medical device, said female unit comprising a hollow cylindrical portion in operative communication with said first end and said second end and having internal shoulders positioned toward said first end, said first end being in the form of a friction-fitting port in the shape of the frustum of a cone for leakless medical device connections and said second end comprising a flange adapted to engage with the threaded lock system of a standard syringe and other male Luer fittings in use with medical devices.

2. Medical devices commonly accessed by syringes, said devices being characterized by comprising a leakless built-in friction-fitting inlet-outlet port in the shape of the frustum of a cone.

3. Device of claim 2 wherein said port is built into an I.V. set.

4. System of claim 1 wherein said frustum has a base, said base having shoulders, said shoulders being adapted to sealingly engage the interior surface of the discharge passageway of a standard syringe.

5. Medical device of claim 2 wherein said frustum has a base, said base having shoulders, said shoulders being adapted to sealingly engage the interior surface of the discharge passageway of a standard syringe.

\* \* \* \* \*